US012790895B2

(12) United States Patent
Adams et al.

(10) Patent No.: US 12,790,895 B2
(45) Date of Patent: Nov. 10, 2026

(54) LADDER SUPPORT ATTACHMENT

(71) Applicant: Formetco, LLC, Duluth, GA (US)

(72) Inventors: Jonathon Christopher Adams, Hoschton, GA (US); Robert L. Franklin, Snellville, GA (US)

(73) Assignee: Formetco, LLC, Duluth, GA (US)

( * ) Notice: Subject to any disclaimer, the term of this patent is extended or adjusted under 35 U.S.C. 154(b) by 1300 days.

(21) Appl. No.: 17/407,983

(22) Filed: Aug. 20, 2021

(65) Prior Publication Data

US 2021/0381313 A1 Dec. 9, 2021

Related U.S. Application Data

(63) Continuation of application No. 15/927,267, filed on Mar. 21, 2018, now Pat. No. 11,125,016.

(Continued)

(51) Int. Cl.
*E06C 7/48* (2006.01)
*E06C 9/02* (2006.01)

(52) U.S. Cl.
CPC . *E06C 7/48* (2013.01); *E06C 9/02* (2013.01)

(58) Field of Classification Search
CPC . E06C 7/48; E06C 7/188; E06C 7/488; E06C 7/16; E06C 9/02; E06C 1/36

(Continued)

(56) References Cited

U.S. PATENT DOCUMENTS 2,805,104 A 9/1957 Johnson
4,359,138 A * 11/1982 Kummerlin ............... E06C 7/44 248/238

(Continued)

FOREIGN PATENT DOCUMENTS

DE 202016105649 U1 12/2016
DE 202019106856 U1 2/2020

(Continued)

OTHER PUBLICATIONS

Collins English Dictionary—Complete and Unabridged, 12th Edition 2014 @ Harper Collins Publishers 1991, 1994, 1998, 2000, 2003, 2006, 2007, 2009, 2001, 2014 (Year: 2014).

(Continued)

*Primary Examiner* — Daniel P Cahn
*Assistant Examiner* — Shiref M Mekhaeil
(74) *Attorney, Agent, or Firm* — Womble Bond Dickinson (US) LLP

(57) ABSTRACT

A ladder support attachment for spacing a ladder from a structure having a support member configured to mount to the structure and stabilizing the ladder; a spacing member integrally coupled to and extending outwardly from an upper edge of the support member; and a trough member integrally coupled to a distal edge of the spacing member and configured to receive a rung of the ladder. The trough member having a first planer member coupled to a distal edge of the spacing member at an acute angle relative to the support member, a second planer member coupled to a portion of a distal edge of the first planer member and extending transverse to the first planer member, and a third planer member being coupled to a distal edge of the second planer member and extending transverse to the first planer member.

10 Claims, 7 Drawing Sheets

Related U.S. Application Data

(60) Provisional application No. 62/474,885, filed on Mar. 22, 2017.

(58) Field of Classification Search
USPC .............................................................. 182/45
See application file for complete search history.

(56) References Cited

U.S. PATENT DOCUMENTS

| | | | | |
|---|---|---|---|---|
| 4,643,275 | A | 2/1987 | LeBlanc | |
| 5,113,973 | A | 5/1992 | Southern | |
| D392,747 | S * | 3/1998 | Ferland | D25/68 |
| 5,911,287 | A * | 6/1999 | Campbell | E06C 7/12 182/103 |
| 5,996,738 | A | 12/1999 | Nelsen | |
| 6,029,774 | A | 2/2000 | Cothern | |
| D426,896 | S * | 6/2000 | Brown | D25/69 |
| 6,513,625 | B1 | 2/2003 | Gaskins | |
| 6,533,069 | B1 * | 3/2003 | Couillard | E06C 7/48 182/83 |
| 7,377,360 | B1 | 5/2008 | Misiak et al. | |
| D595,069 | S | 6/2009 | Berry | |
| 7,845,468 | B2 * | 12/2010 | Steblinski | E02D 17/08 211/175 |
| D661,406 | S | 6/2012 | Finch | |
| 8,528,695 | B1 * | 9/2013 | Orpia | E06C 7/48 182/206 |
| D715,458 | S | 10/2014 | Collins | |
| 9,567,804 | B2 * | 2/2017 | Youlyahshiev | E06C 7/48 |
| D791,972 | S * | 7/2017 | Goodnow | D25/68 |
| D801,547 | S | 10/2017 | Lopez | |
| 9,890,589 | B2 | 2/2018 | Goodnow | |
| 10,161,186 | B1 | 12/2018 | Long | |
| D839,450 | S | 1/2019 | Lanzafame | |
| D859,610 | S | 9/2019 | Gori | |
| D869,687 | S | 12/2019 | Davis | |
| D871,614 | S | 12/2019 | Stevens, Jr. | |
| D872,881 | S | 1/2020 | Green | |
| D873,441 | S | 1/2020 | Jiang | |
| D880,008 | S | 3/2020 | Adams et al. | |
| D882,120 | S | 4/2020 | Adams et al. | |
| 11,136,824 | B2 * | 10/2021 | James, Jr. | E06C 7/505 |
| 11,313,174 | B2 * | 4/2022 | MacKarvich | E06C 7/484 |
| 2003/0213646 | A1 * | 11/2003 | Gallion | E06C 7/14 182/129 |
| 2004/0089501 | A1 | 5/2004 | Hockensmith | |
| 2005/0045421 | A1 * | 3/2005 | Gaines | E06C 7/482 182/107 |
| 2005/0194213 | A1 * | 9/2005 | Beczak | E06C 7/143 182/129 |
| 2007/0278037 | A1 | 12/2007 | Michel et al. | |
| 2009/0020360 | A1 | 1/2009 | May | |
| 2009/0255759 | A1 | 10/2009 | Barnes | |
| 2010/0213009 | A1 | 8/2010 | Guinovart et al. | |
| 2015/0226002 | A1 * | 8/2015 | Johansen | E06C 7/12 182/217 |
| 2016/0108670 | A1 | 4/2016 | Youlyahshiev | |
| 2016/0130876 | A1 | 5/2016 | Roseveare, Jr. et al. | |
| 2016/0208555 | A1 * | 7/2016 | Dehoff | E06C 7/48 |
| 2017/0175445 | A1 | 6/2017 | Brown, Jr. | |
| 2018/0274295 | A1 * | 9/2018 | Adams | E06C 7/48 |
| 2019/0195017 | A1 * | 6/2019 | Davis | E06C 7/087 |
| 2021/0238925 | A1 * | 8/2021 | MacKarvich | E06C 7/484 |

FOREIGN PATENT DOCUMENTS

| | | |
|---|---|---|
| KR | 20-2011-0008779 | 9/2011 |
| WO | WO2016/191531 A1 | 12/2016 |

OTHER PUBLICATIONS

International Search Report & Written Opinion of the International Searching Authority; PCT Application No. PCT/US2018/023473 mailed Jul. 10, 2018.

* cited by examiner

LADDER SUPPORT ATTACHMENT

CROSS-REFERENCE TO RELATED APPLICATION

The present patent application is a Continuation of U.S. application Ser. No. 15/927,267, filed Mar. 21, 2018, which claims benefit of U.S. Provisional Application No. 62/474,885, filed Mar. 22, 2017.

INCORPORATION BY REFERENCE

The disclosures of U.S. application Ser. No. 15/927,267, filed Mar. 21, 2018, and U.S. Provisional Application No. 62/474,885, filed Mar. 22, 2017, are hereby incorporated by reference for all purposes as if presented herein in their entireties.

FIELD OF THE INVENTION

The present disclosure relates generally to ladder support attachments and more particularly to ladder support attachments configured to be mounted to a substantially vertical wall or a substantially vertical ladder and to stabilize an attached ladder relative to the wall at a desired acute angle.

BACKGROUND

Ladder stabilizing devices or attachments are known in the art and are conventionally used to space a ladder from the wall of a structure and stabilize the attached ladder as it rests relative to the wall. The primary use of such ladder stabilizing devices is to permit additional work space away from the wall for a person climbing the ladder, as is often necessary when painting a wall, cleaning the gutters of a building, or using the ladder to climb on to a roof. Prior art stabilizing devices are also useful when attempting to work proximate fragile features of a structure, such as windows and gutters, because they allow these features to be accessed without having to rest the legs of the ladder directly thereon.

Prior art ladder support devices typically include unshaped support members that are supported in a fixed position on a ladder by means of brackets or clamps that are bolted or otherwise fastened to either the ladder legs or rungs. Many prior art devices utilize chains between the support members and the ladder to enhance the stability of the entire assembly. Furthermore, many utilize shaped brackets or channels that engage multiple rungs of the ladder to provide enhanced support. Some examples of prior art ladder support devices employing the above-referenced features can be found in U.S. Pat. Nos. 3,568,801, 4,331,217, 4,369,860, 4,502,566, 4,615,412, 4,823,912 and 5,010,979.

The aforementioned ladder support devices all accomplish the objective of spacing a ladder from a vertical surface in some fashion, but generally suffer from complexity of design, use and manufacture. Prior art ladder support devices often involve numerous fasteners that must be tightly secured prior to use and provide support members that rest against the wall at a sub-optimal angle for safe use of the ladder. Furthermore, many of the prior art devices are expensive to manufacture thereby discouraging sales to the public.

It would be desired to provide an improved ladder support attachment that may be secured to a substantially vertical wall or ladder with a minimum of effort.

It would be desired to provide an improved ladder support attachment that allows for the mounting of a ladder with a minimum of effort.

It would also be desired to have a ladder support attachment that utilizes the load placed on the ladder support attachment by the ladder to hold the ladder at the desired acute angle.

Accordingly, there is a need in the art for an ladder support attachment, which can be coupled to a portion of a substantially vertical wall or a substantially vertical ladder that can operatively position a ladder that is selectively coupled to the ladder support attachment at a desired acute angle relative to the substantially vertical wall or ladder to enhance the stability of the ladder and the safety of personnel using the coupled ladder.

SUMMARY

Described herein is a ladder support attachment and a method of using a ladder support attachment. In one aspect, the ladder support attachment of the present invention provides a ladder support attachment having an efficient simple design that permits a user to quickly and easily attach the ladder support attachment to a desired portion of the substantially vertical wall or a pre-existing substantially vertical ladder. In one aspect, the ladder support attachment is configured to utilize the load placed on the ladder support attachment by a ladder that is selectively and securably coupled to the ladder support attachment at the desired acute angle. In a further aspect, the ladder support attachment includes no supports or struts that extend below the point of attachment of the ladder to the ladder support attachment.

In one aspect, described herein is a ladder support attachment for spacing a ladder from a structure. In this aspect, the ladder support attachment can have a support member configured to mount to the structure and stabilizing said ladder; a spacing member integrally coupled to and extending outwardly from an upper edge of the support member; and a trough member integrally coupled to a distal edge of the spacing member and configured to receive a rung of the ladder. It is contemplated that the trough member can comprise a first planer member coupled to a distal edge of the spacing member and extending therefrom at an acute angle relative to the support member; a second planer member coupled to at least a portion of a distal edge of the first planer member and extending transverse to the first planer member, and a third planer member being coupled to a distal edge of the second planer member and extending transverse to the first planer member. In optional aspects, it is contemplated that the trough member can be formed as a unitary member and/or the support member, the spacing member and the trough member can be formed as a unitary member.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
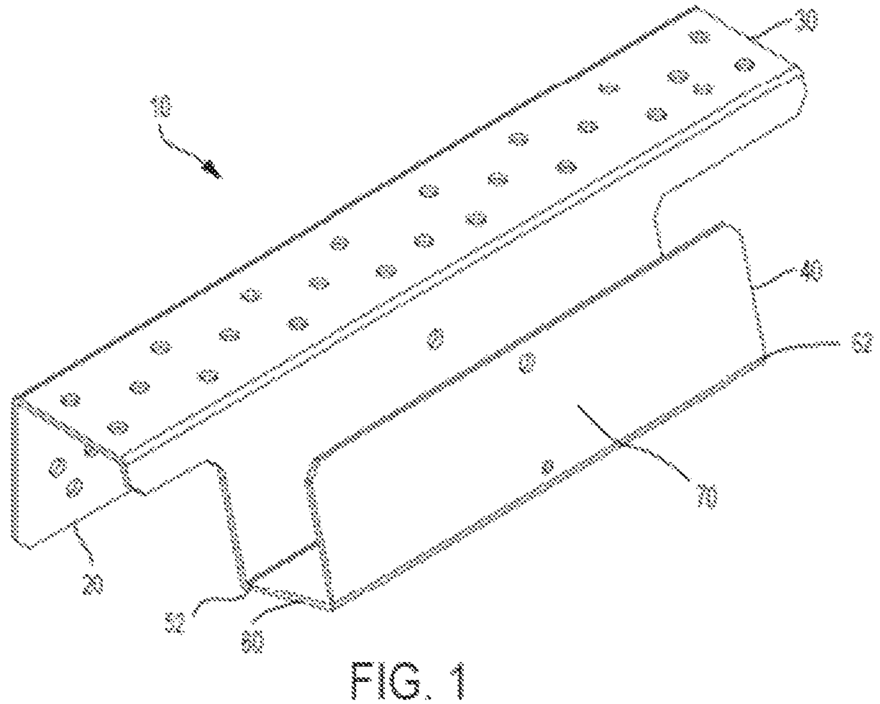
FIG. 1 is a front perspective view of one embodiment of a ladder support attachment.
Figure 2:
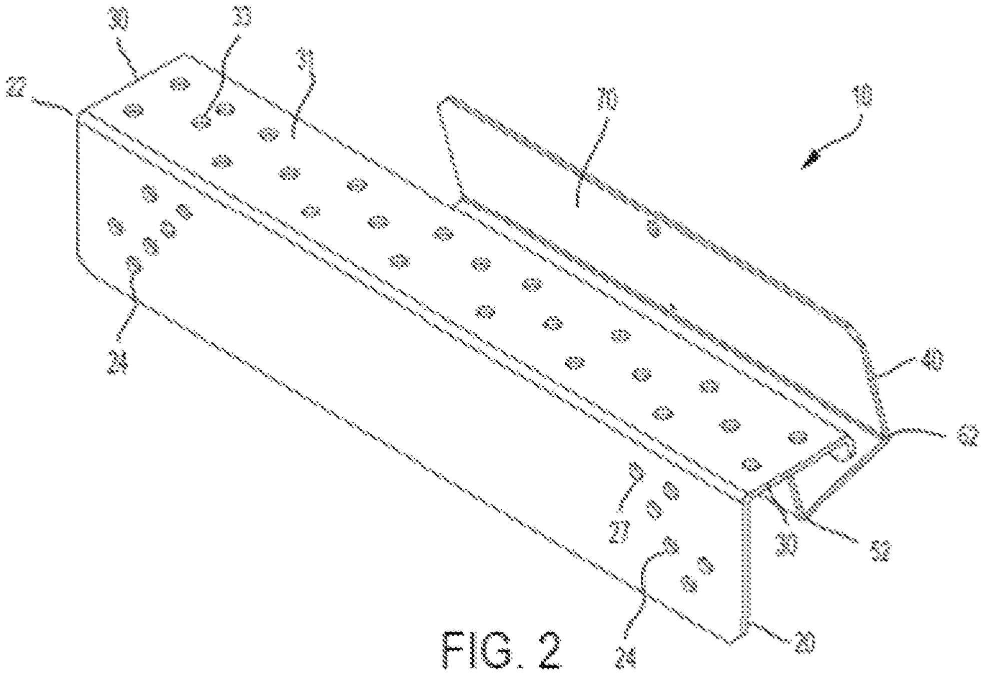
FIG. 2 is a rear perspective view of the ladder support attachment of FIG. 1.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

For clarity, it will be appreciated that this disclosure shows end or cross-sectional views of a ladder support attachment. As such, it is contemplated that the described cross-section features of the elements forming the ladder support attachment can also extend the elongate longitudinal length of the respective elements such as, for example and without limitation, the base member, the tongue member and the locking member.

As used throughout, the singular forms “a,” “an” and “the” include plural referents unless the context clearly dictates otherwise. Thus, for example, reference to “an opening” can include two or more such openings unless the context indicates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

As used herein, the terms “optional” or “optionally” mean that the subsequently described event or circumstance can or cannot occur, and that the description includes instances where said event or circumstance occurs and instances where it does not.

The word “or” as used herein means any one member of a particular list and also includes any combination of members of that list. Further, one should note that conditional language, such as, among others, “can,” “could,” “might,” or “can,” unless specifically stated otherwise, or otherwise understood within the context as used, is generally intended to convey that certain Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

Described herein is a ladder support attachment 10 and a method of using a ladder support attachment. In a typical installation, the ladder support attachment 10 is fixedly mounted to a substantially vertical wall 2 or a substantially vertical ladder 4. It is contemplated that a conventional access ladder 5, having a pair of spaced vertical legs 6 and a plurality of spaced transversely mounted rungs 8, can be mounted therein the ladder support attachment to appropriately space the ladder from the plane of the substantially vertical wall or a substantially vertical ladder and to appropriately position the ladder at a desired acute angle β relative to the substantially vertical wall or a substantially vertical ladder. In one aspect, it is contemplated that the desired acute angle β is between about 70 to about 80 degrees and, preferably about 75 degrees.

The ladder support attachment 10 of the present invention helps to prevent ladders from slipping or tipping unexpectedly while accessing catwalks or fixed ladders. As shown, it is contemplated that the installation of this ladder support attachment 10 is permanent with respect to the structure, and, as such, can create a safe access point for placement of an access ladder to a specific area of a structure, taking the guess work out of where to place a ladder at each structure location. The ladder support attachment 10 aids is preventing unstable ladders for both the first man up and other climbers, while insuring that the access ladder 5 is placed at the desired acute angle β. While the ladder support attachment 10 acts as a stabilizing product to keep ladders in place, it is contemplated that the weight of a person on the access ladder 5 should be supported by placement of the legs of the access ladder 5 on the ground and against the ladder support attachment 10.

Referring to the figures, the ladder support attachment 10 for stabilizing a access ladder 5 at a desired distance from a structure and at a desired acute angle β relative to the structure can comprise a support member 20, a spacing member 30, and a trough member 40. It is contemplated that the trough member, or optionally, the ladder support attachment 10, can be formed as a unitary structure. The support member 20, spacing member 30, and trough member 40 can be made from any material possessing the necessary strength to support the access ladder 5 and the concomitant load thereon when the access ladder 5 is in use, such as, for example and without limitation, galvanized steel, aluminum or metal tubing or solid stock, plastic, reinforced fiberglass, carbon fiber, suitable hardwoods, and the like. One of ordinary skill in the art will recognize that this list is representative of materials that may be used, and is not exhaustive.

In one aspect, the support member 20 is configured to fixedly mount to the structure and to aid in stabilizing the access ladder 5. The support member defines a plurality of openings 24 that are configured to receive a plurality of fasteners 25, such as, for example and without limitation, screws, bolts, nails, and the like, which are configured to securely mount the support member to the structure.

The spacing member 30 is integrally coupled to and extends outwardly from an upper edge 22 of the support member. It is contemplated that the spacing member will be positioned substantially at a right angle relative to the support member and will have a width W1 of between about 5.0 to about 2.0 inches, preferably between about 4.0 to about 2.5 inches, and most preferred about 3.0 inches.

In one aspect, the spacing member 30 can further comprise means to increase the traction level for a user stepping on the upper surface 31 of the spacing member. The means to increase the traction level can comprise, for example and without limitation, frictional tape that can be secured to the upper surface and that has a desired level of embedded grit to provide a desired level of anti-slip traction; texture, such as elevated patterns formed in the upper surface of the spacing member; punched openings positioned in patterns formed in the upper surface of the spacing member, and the like. As shown in the figures, it is contemplated that the spacing member can define a plurality of staggered punched openings 33 that are spaced across the longitudinal length of the spacing member. In this aspect, the distal end of each of the staggered punched openings extends outwardly from a plane P defined by the upper surface 31 of the spacing member 30, which provides for a textured surface with anti-slip properties.

Referring to FIGS. 1-8, in a first embodiment of the ladder support attachment 10, the trough member 40 can be integrally coupled to a distal edge 32 of the spacing member 30 and can be configured to operatively and selectively receive a rung 8 of the access ladder 5. In this aspect, the trough member 40 can comprise a first planer member 50, an integrally coupled second planer member 60, and an integrally coupled third planer member 70. The first planer member 50 can be coupled to at least a portion of the distal edge 32 of the spacing member 30 and can extend downwardly away from a juncture of the first planer member and the spacing member at an acute angle α relative to the support member 20. In one aspect, the acute angle α can be substantially the same as the desired acute angle β. Optionally, and as exemplarily illustrated, the distal end portion 37 of the spacing member can be rounded in cross-section such that the distal edge 32 of the spacing member 30 is positioned in a plane that is at the acute angle α relative to the support member 20. In this aspect, the first planer member is coupled to a portion of the distal edge 32 of the spacing member 30 and can extend downwardly away from a juncture of the first planer member and the spacing member at an acute angle α relative to the support member 20. In one aspect, the spacing member 30 and the support member 20 can have the same longitudinal length L1. In a further aspect, at least one of the first, second and third planer members can have the same longitudinal length L2. Optionally, as illustrated in this embodiment, each of the first, second and third planer members can have the same longitudinal length L2.

It is contemplated that the trough member 40 will have a longitudinal length L2 of between about 14.5 to about 11.0 inches, preferably between about 13.5 to about 12.0 inches, and most preferred between about 13.0 to about 12.5 inches. It is preferred that the longitudinal length L2 of the trough member 40 be less than the width of the legs 6 of the conventional ladder that will be selectively coupled to the ladder support attachment 10. This preferred longitudinal length L2 of the trough member 40 allows for a rung 8 of the selectively received access ladder 5 to be seated thereon the upper surface of the second planer member 60 of the trough member and allows for the trough member 40 to be positioned between the spaced legs 6 of the ladder.

Figure 5:
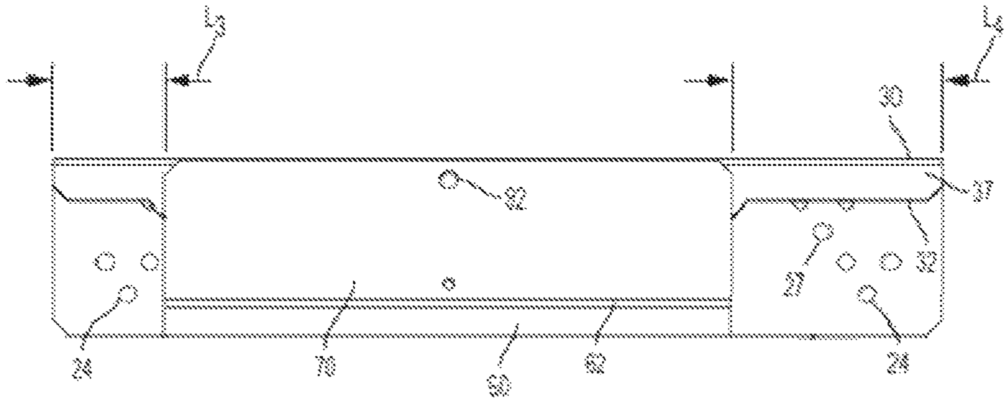
FIG. 5 is a front elevational view of the ladder support attachment of FIG. 1.
Figure 6:
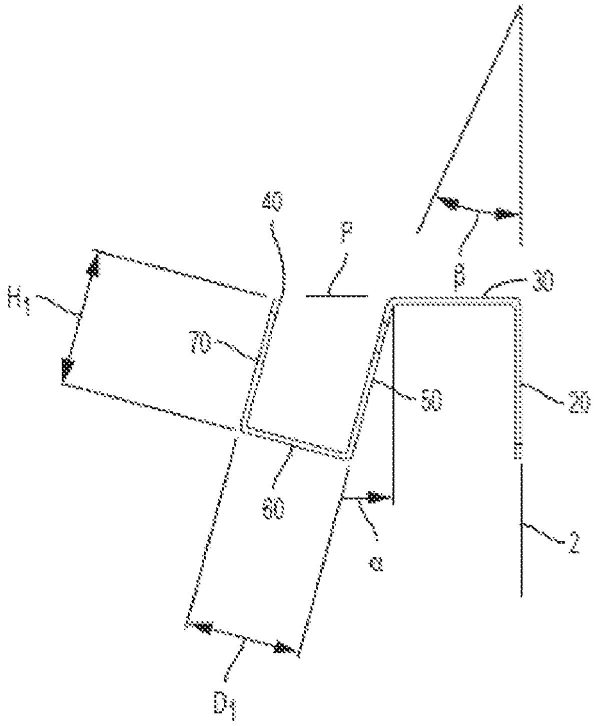
FIG. 6 is a side elevational view of the ladder support attachment of FIG. 1.

In a further aspect, it is contemplated that the trough member 40 will have a longitudinal length L2 that is less than the longitudinal length of the spacing member L1. In this aspect, the longitudinal length L2 of the trough member can be between about 50 to about 78 percent of the longitudinal length of the spacing member L1, preferably between about 56 to about 72 percent of the longitudinal length of the spacing member L1, and most preferred between about 62 to about 66 percent of the longitudinal length of the spacing member L1. The reduced longitudinal length of the trough member 40 relative to the spacing member 30 and the support member 20 allows for access, from a front elevational aspect as shown in FIG. 5, to portions of the support member, which, as described in more detail below, allows for ready installation of the ladder support attachment 10 to the substantially vertical wall 2 or a substantially vertical ladder 4.

In yet another aspect, the trough member 40 can be integrally coupled to a distal edge 32 of the spacing member 30 such that the trough member is offset longitudinally from a center point of the spacing member. As shown, it is contemplated that one end of the trough member 40 can be longitudinally spaced away from a first end edge of the spacing member 30 and the support member 20 at a first distance L3 and the opposite end of the trough member 40 can be longitudinally spaced away from a second end edge of the spacing member 30 and the support member 20 at a second distance L4. In this exemplary aspect, the first distance L3 will be less than the second distance L4.

The second planer member 60 can be coupled of a distal edge 52 of the first planer member 50 and can extend outwardly substantially transverse to the first planer member 50. It is contemplated that the second planer member 60 will have a depth D1 of between about 2.50 to 3.25 inches, preferably about 2.75 to 3.00 inches, and most preferred about 2.875 inches. It is preferred that the depth D1 of the second planer member 60 be at least the width of the rung 8 of the conventional ladder 5 that will be selectively received therein the ladder support attachment 10. This preferred depth D1 of the second planer member allows for a rung of the selectively received ladder to be seated thereon an upper surface 61 of the second planer member 60 of the trough member, which allows for the received ladder to be positioned at the desired acute angle β relative to the substantially vertical wall 2 or a substantially vertical ladder 4.

Further, the third planer member 70 can be coupled to a distal edge 62 of the second planer member 60 and can extend transverse to the second planer member 60. In one aspect, the first planer member 50 and the third planer member 70 can be positioned in planes that are substantially parallel to each other. Thus, as shown in the end elevational view of FIG. 6, it is contemplated that the trough member 40 can have a U-shape in cross-section. It is contemplated that the third planer member 70 will have a height H1 that is configured such that a distal edge 72 of the third planer member is positioned substantially at or below the plane P defined by the upper surface 33 of the spacing member 30. In an optional aspect, as exemplarily illustrated, the distal edge 72 of the third planer member can be positioned in the plane P defined by the upper surface 33 of the spacing member 30.

In a second embodiment, and as illustrated in FIGS. 9-13, the trough member 40 of the ladder support attachment 10 can be integrally coupled to a distal edge 32 of the spacing member 30 and can be configured to operatively and selectively receive a rung 8 of the access ladder 5. The first planer member 50 of the trough member 40 can be coupled to the distal edge 32 of the spacing member 30 and can extend downwardly away from a juncture of the first planer member and the spacing member at the acute angle α relative to the support member 20. In one aspect, the acute angle α can be substantially the same as the desired acute angle β. The second planer member 60 can be coupled to a middle portion 54 of a distal edge 52 of the first planer member 50 and can extend outwardly transverse to the first planer member 50. Further, the third planer member 70 can be coupled to a distal edge 62 of the second planer member 60 and can extend transverse to the second planer member 60. In one aspect, the first planer member 50 and the third planer member 70 can be positioned in planes that are substantially parallel to each other. Thus, as shown in the end elevational view of FIG. 11, it is contemplated that the trough member 40 can have a U-shape in cross-section.

In this aspect, it is contemplated that the support member 20 can be configured to be secured to the structure such that the spacing member provides a predetermined spacing to the trough member so that, when the rung 8 of the access ladder 5 is positioned therein the trough member and in contact the second planer member 60, the access ladder 5 is positioned at the desired acute angle β. It is also contemplated that the longitudinal length L5 of the first planer member be greater than the width of the legs 6 of the ladder 5. Optionally, the longitudinal length L5 of the first planer member will be substantially the same as the longitudinal length L1 of the support member. Further, it is contemplated that the longitudinal lengths L6 of the second and third planer members are less than the longitudinal length L5 of the first planer member. It is further contemplated that the second and third planer members have the same longitudinal length L6.

In this embodiment, the ladder support attachment 10 can further comprises a pair of spaced ear members 80. In this aspect, the ear members 80 are integrally coupled to and extend therefrom spaced first and second side edges 56, 58 of the first planer member 50. Thus, it is contemplated that each ear member 80 extends outwardly substantially transverse to the first planer member 50. The spaced ear members 80 can be positioned substantially parallel to each other and, optionally, a lower edge 82 of each of the spaced ear members can be positioned in the same plane as the second planer member 60. In this aspect, each of the ear members 80 is spaced from the outer edges of the respective second and third planer members to define a pair of spaced openings 84 between the respective ear members 80 and the adjacent outer edges of the respective second and third planer members. As one skilled in the art will appreciate upon review of the figures, it is contemplated that the pair of spaced openings 84 are configured to receive the vertical legs 6 of the ladder 5.

In this embodiment, the first planer member 50 can optionally define two spaced elongated openings 21 positioned proximate the spaced first and second side edges 56, 58 of the first planer member 50. The elongate openings 21 can extend along an axis that is substantially parallel to the respective spaced first and second side edges 56, 58 of the first planer member 50 or can optionally extend at an angle relative to the respective spaced first and second side edges 56, 58. One skilled in the art will appreciate that the elongate openings 21 allow for access, from a front elevational aspect as shown in Figure X, to portions of the support member, which allows for ready installation of the ladder support attachment 10 to the substantially vertical wall 2 or a substantially vertical ladder 4.

In this embodiment, it is contemplated that the second and third planer members will have a longitudinal length L6 of between about 14.5 to about 11.0 inches, preferably between about 13.5 to about 12.0 inches, and most preferred between about 13.0 to about 12.5 inches. It is preferred that the longitudinal length L6 of the second and third planer members be less than the width of the legs 6 of the conventional access ladder 5 that will be selectively received therein the ladder support attachment 10. This preferred longitudinal length L2 of the trough member 40 allows for a rung of the selectively received ladder to be seated thereon the upper surface of the second planer member 60 of the trough member while also allowing, if configured with the spaced ear members 80, the vertical legs 6 of the ladder to be received therein the pair of spaced openings 84.

In one aspect, it is contemplated that the support member 20 can be configured to be secured to the structure such that the spacing member 30 provides a predetermined spacing to the trough member so that the rung 8 of the access ladder 5 positioned therein the trough member and in contact the second planer member 60 is positioned at the desired acute angle β from vertical.

Figure 9:
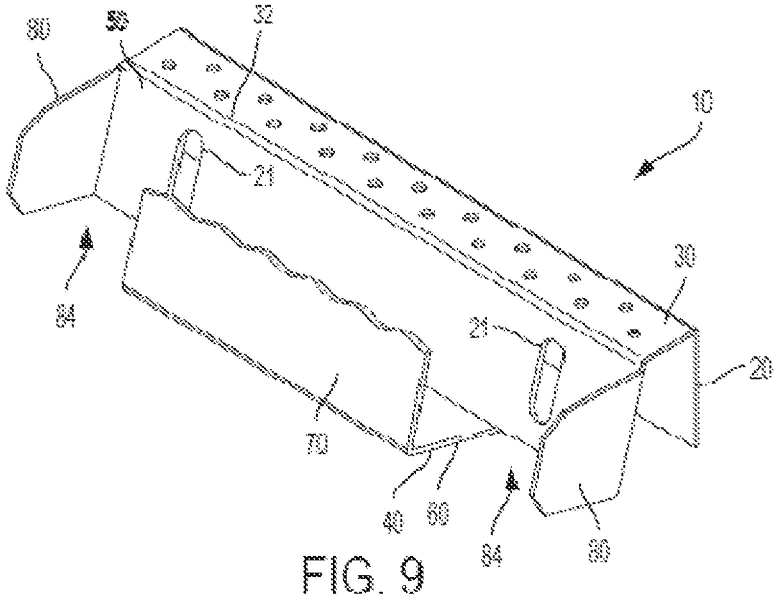
FIG. 9 is a perspective view of a second embodiment of a ladder support attachment.
Figure 10:
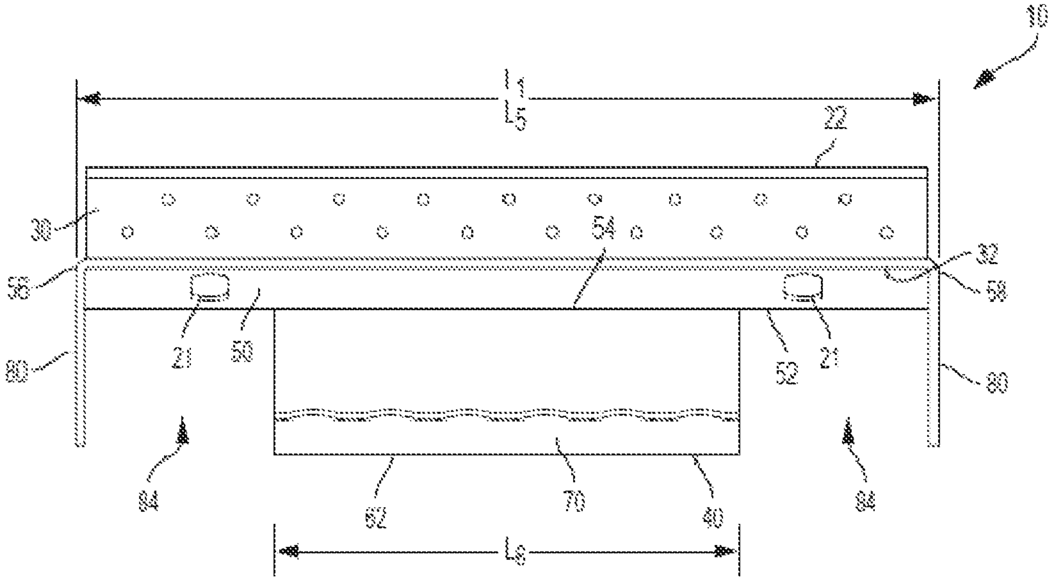
FIG. 10 is a top elevational view the ladder support attachment of FIG. 9.
Figure 11:
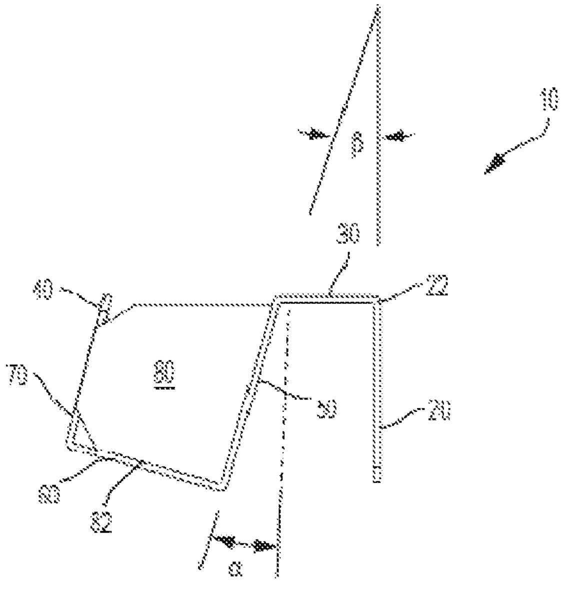
FIG. 11 is an end elevational view of the ladder support attachment of FIG. 9.
Figure 12:
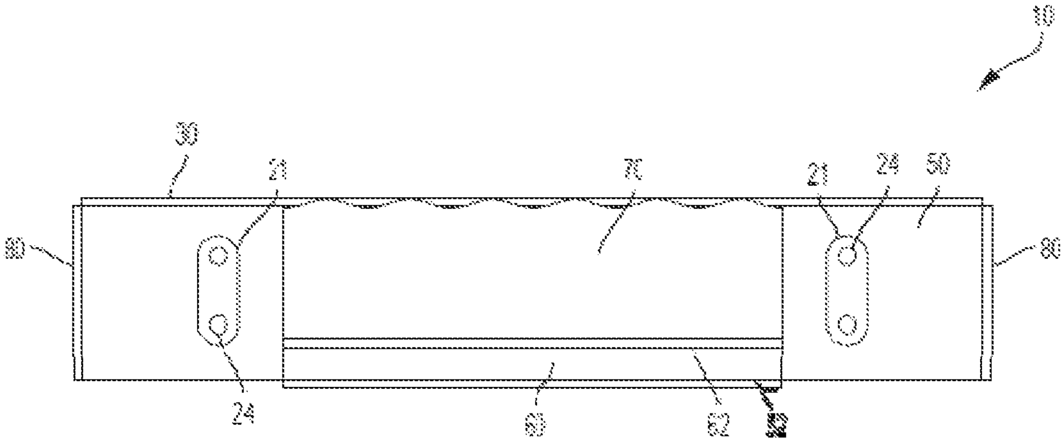
FIG. 12 is a front elevational view of the ladder support attachment of FIG. 9.
Figure 13:
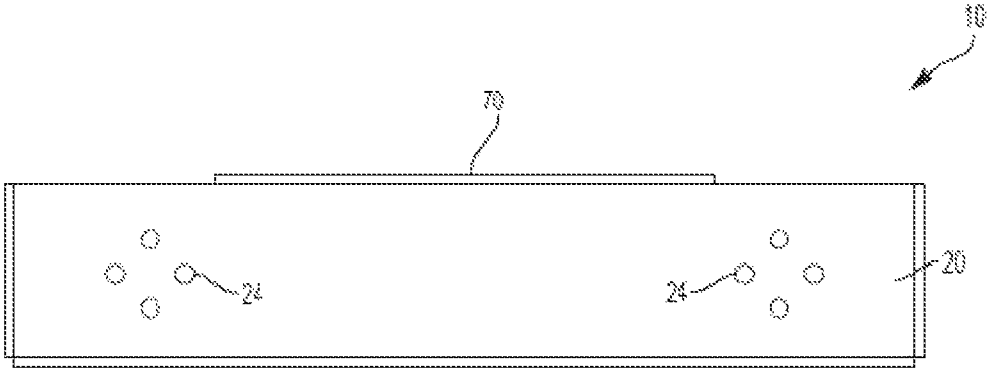
FIG. 13 is a back elevational view of the ladder support attachment of FIG. 9.

The ladder support attachment 10 of FIGS. 1 and 9 can be mounted to a portion of a substantially vertical wall, and exemplarily to a kick-rail of a structure. In this exemplary aspect, the substantially vertical wall can be a kick-rail of a structure that is positioned adjacent the roof of the structure. In this aspect, it is contemplated that a plurality of fasteners 25, such as, for example and without limitation, nails, bolts, screws, and the like, can be used to fixedly mount the ladder support attachment 10 to the underlying substantially vertical wall, or kick-rail as shown, via a plurality of openings 24 defined in the respective end portions of the support member 20 of the ladder support attachment 10. In one aspect, it is contemplated that the plurality of openings 24 can comprise a pattern of openings 27. At least a portion of the pattern of openings can extend along an axis that is offset from the vertical. Optionally, at least a portion of the pattern of openings can extend along an axis that is offset from the vertical and extends inwardly from the bottom to the top of the support member.

Figure 7:
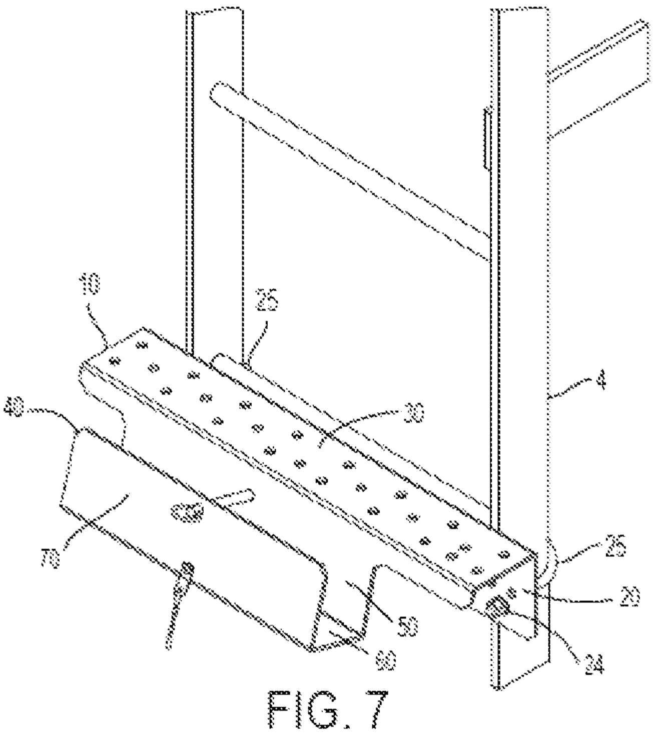
FIG. 7 is a front perspective view the ladder support attachment of FIG. 1 being mounted to a portion of a substantially vertical ladder.
Figure 8:
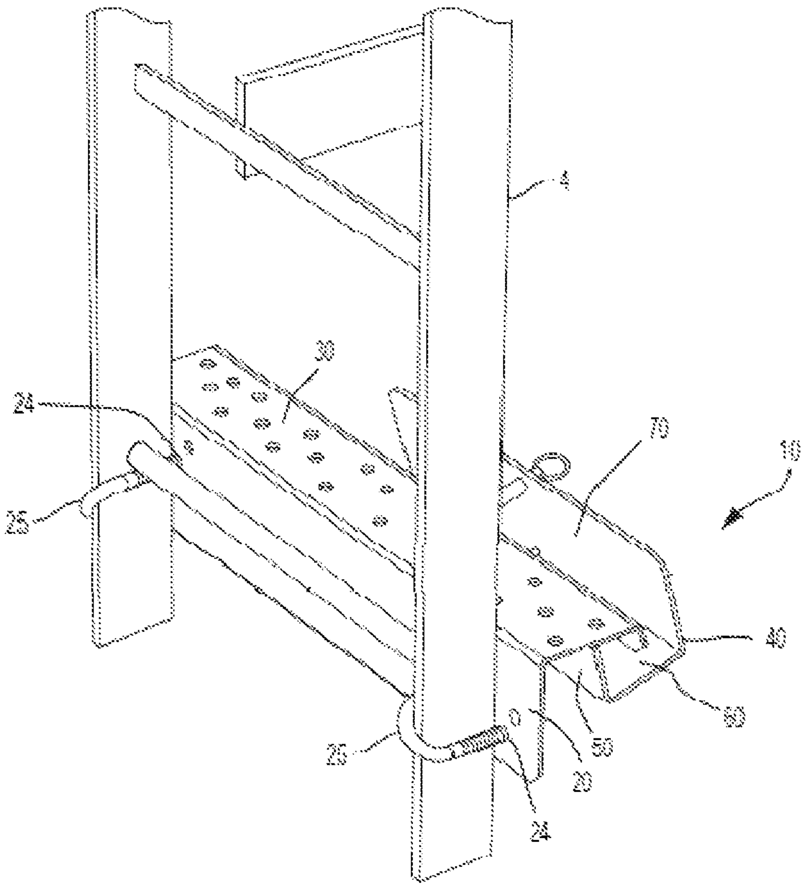
FIG. 8 is a rear perspective view the ladder support attachment of FIG. 1 being mounted to a portion of a substantially vertical ladder.

FIGS. 7 and 8 illustrate the ladder support attachment 10 of FIGS. 1 and 9 mounted to a lower portion of a substantially vertical ladder. In this aspect, it is contemplated that a plurality of fasteners 25, in the form of conventional U-shaped bolts, with the suitable nuts and/or washers, can be used to fixedly mount the ladder support attachment 10 to a lower portion of the underlying substantially vertical ladder 4 proximate to a rung, via the plurality of openings 24 defined in the support planer member of the ladder support attachment 10.

Figure 3:
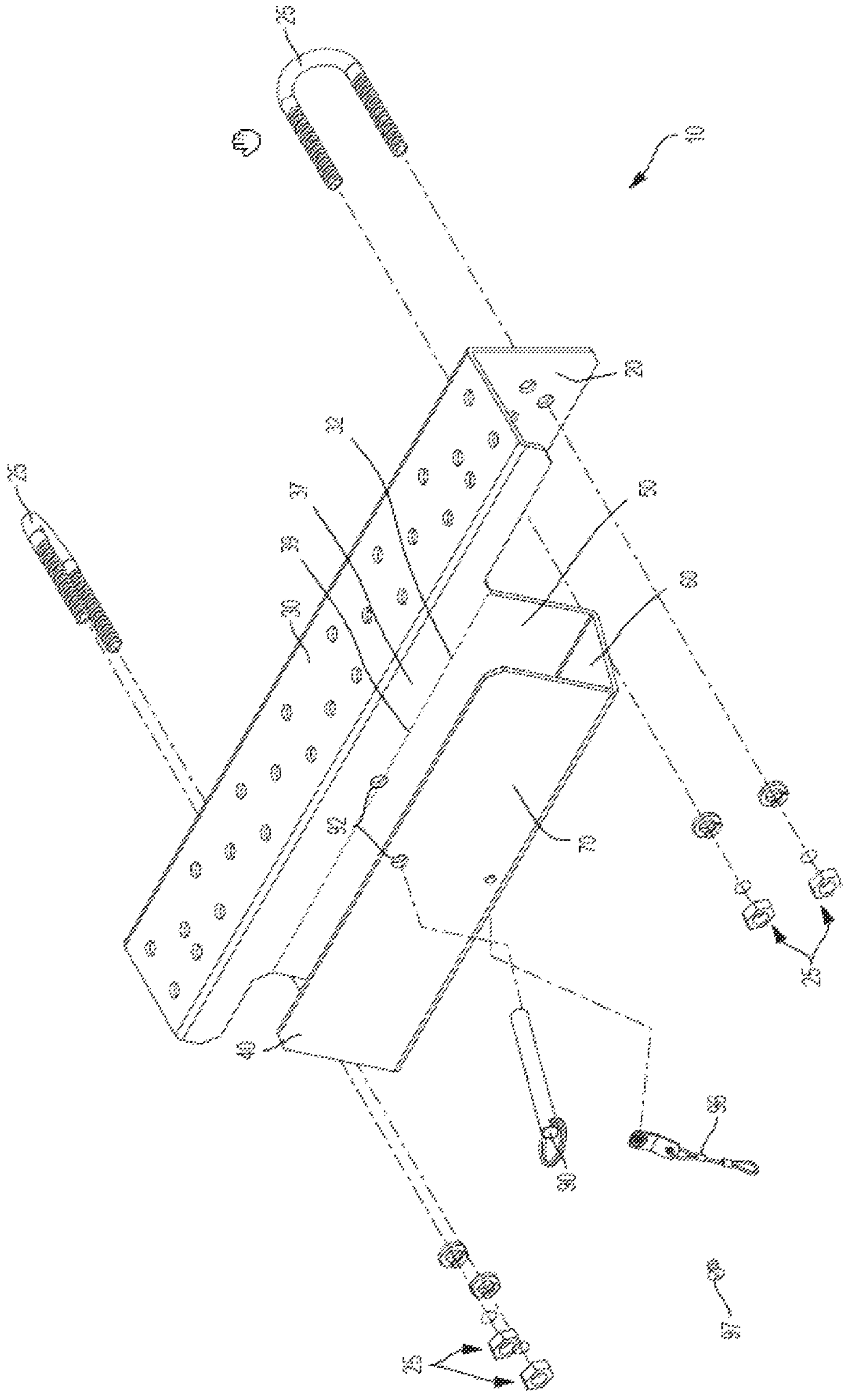
FIG. 3 is an exploded front perspective view of the ladder support attachment of FIG. 1.
Figure 4:
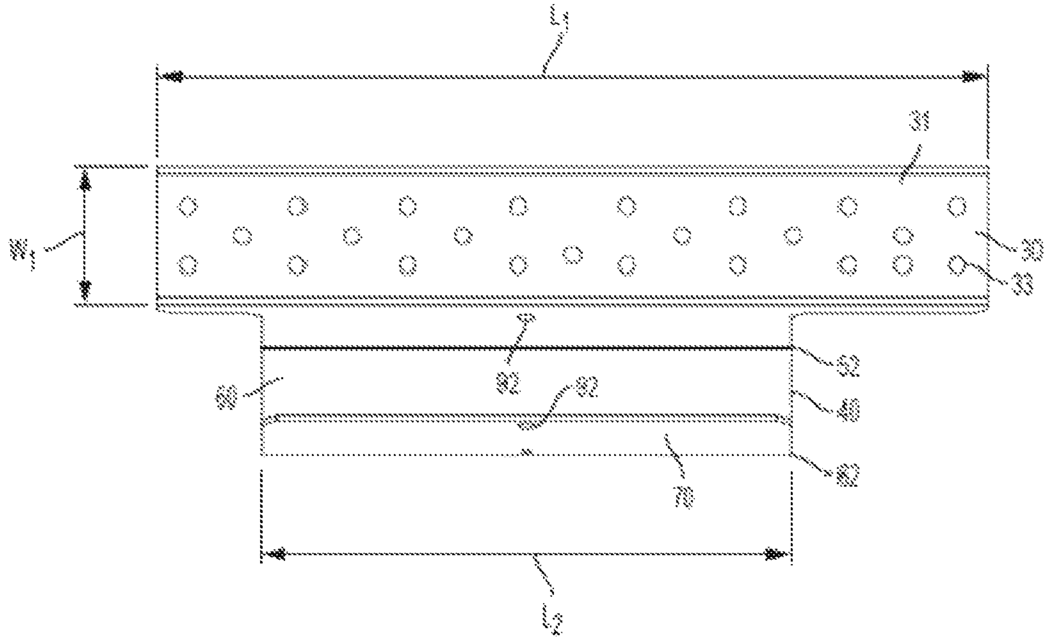
FIG. 4 is a top elevational view of the ladder support attachment of FIG. 1.

The ladder support attachment can further comprise, as shown in FIG. 3, a pin 90 that is configured to be selectively received in a pair of opposed openings 92 defined in the first and third planer members. In operation, after the ladder 5 is received therein the trough 40, it is contemplated that the pin can be selectively mounted therein the pair of opposed openings, in a locking configuration, to insure that the ladder 5 cannot be displaced from the interior of the trough. A clip 96 can be mounted via a fastener 97 to the outer surface of the third planer member. In this optional aspect, the clip 96 is configured to conventionally couple to the proximal end of the pin to ensure that the pin remains coupled to the ladder support attachment when not in the locking configuration.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

What is claimed is:

1. A ladder support attachment for selectively receiving and spacing a ladder having a pair of spaced vertical legs and a plurality of spaced transversely mounted rungs from a substantially vertical structure, the pair of spaced legs of the ladder being spaced at a first distance and each rung of the ladder having a width distance, comprising:

a support member configured to mount to the substantially vertical structure and stabilize the ladder;

a spacing member integrally coupled to and extending outwardly from an upper edge of the support member, wherein an upper surface of the spacing member is positioned in a spacing member plane substantially transverse to the support member;

a trough member integrally coupled to a distal edge of the spacing member and configured to receive one of the plurality of rungs of the ladder, the trough member having a first planar member integrally coupled to a second planar member and a third planar member integrally coupled to the second planar member, the first planar member being coupled to the distal edge of the spacing member and extending downwardly away from the spacing member plane of the spacing member at an acute angle $\alpha$ relative to the support member, the second planar member being coupled to a distal edge of the first planar member and extending substantially transverse to the first planar member, the third planar member being coupled to a distal edge of the second planar member and extending substantially transverse to the second planar member and parallel to the first planar member; and a pair of spaced ear members, wherein the first planar member of the trough member has a first side edge and a second side edge, wherein one respective ear member of the pair of spaced ear members is integrally coupled to each of the respective first and second side edges of the first planar member such that each ear member extends outwardly transverse to the first planar member, wherein the spaced ear members are positioned substantially parallel to each other, wherein each of the ear members is spaced from the outer edges of the respective second and third planar members to define a pair of spaced openings between the respective ear members and the adjacent outer edges of the respective second and third planar members, where said spaced openings are configured to receive portions of the vertical legs of the ladder, and wherein a lower edge of each of the pair of spaced ear members is coplanar with the second planar member, wherein the trough member has a longitudinal length and is centered longitudinally relative to a center point of the spacing member, wherein the trough member is configured to receive one of the plurality of rungs of the ladder to position the ladder at a desired acute angle ß relative to the substantially vertical structure, and wherein the longitudinal length of the trough member is less than the first distance between the respective legs of the ladder and less than a longitudinal length of the spacing member to allow for one of the plurality of rungs of the ladder to be seated thereon an upper surface of the second planar member of the trough member and to allow for the trough member to be positioned between the spaced legs of the ladder.

2. The ladder support attachment of claim 1, wherein the acute angle a is substantially the same as the desired acute angle $\beta$.

3. The ladder support attachment of claim 1, wherein the support member defines a plurality of openings that are configured to operatively receive a plurality of fasteners, which are configured to mount the support member to the structure.

4. The ladder support attachment of claim 1, wherein the spacing member further comprises means to increase a traction level for a user stepping on an upper surface of the spacing member.

5. The ladder support attachment of claim 1, wherein the depth of the second planar member is at least the width distance of the rung of the ladder, and wherein the depth of the second planar member allows for one of the plurality of rungs of the ladder to be seated thereon an upper surface of the second planar member thereby allowing the ladder to be positioned at the desired acute angle $\beta$.

6. The ladder support attachment of claim 5, wherein the acute angle $\beta$ is between 70 to 80 degrees.

7. The ladder support attachment of claim 1, wherein the first planar member and the third planar member are positioned in planes that are substantially parallel to each other, wherein the trough member has a U-shape in cross-section, and wherein the third planar member has a height that is configured such that a distal edge of the third planar member is positioned substantially at or below the spacing plane defined by the upper surface of the spacing member.

8. The ladder support attachment of claim 1, wherein the first planar member defines two spaced elongated openings positioned proximate the spaced first and second side edges of the first planar member to allow for access to portions of the support member.

9. The ladder support attachment of claim 8, wherein each elongated opening extends along an axis that is substantially parallel to the respective spaced first and second side edges of the first planar member.

10. The ladder support attachment of claim 8, wherein each elongated opening extends along an axis that is angled relative to the respective spaced first and second side edges of the first planar member.

* * * * *